Oct. 11, 1927.  
P. E. FENTON  
1,645,499  
SINGLE PIN SOCKET  
Filed Feb. 19, 1927

Inventor  
Paul E. Fenton  
by  
Attorney

Patented Oct. 11, 1927.

1,645,499

UNITED STATES PATENT OFFICE.

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT.

SINGLE-PIN SOCKET.

Application filed February 19, 1927. Serial No. 169,589.

The object of this invention is to provide, more particularly, a pin-mounted socket member of a head and socket fastener of the snap fastener type, especially designed for use in attaching covers to the upholstered parts of automobiles.

Without thereby limiting the applicability of the invention, I will describe it as used in connection with the attachment of such covers; it being premised that the head or stud member of the fastener is permanently applied to the cover, while the pin member is placed on the upholstered part in such position as to readily and accurately receive and engage the head or stud member, to secure the cover in place in a smooth and symmetrical manner.

I have herein illustrated my invention as applied to a well-known form of resilient socket member, illustrated, for example, in the patents of Warner, No. 820,612, May 15, 1906 and Hyde, No. 920,063, Apr. 27, 1909, with the attaching portion modified to engage the head of the pin.

The invention consists of a single-pin socket in which the socket has a portion to engage with a complemental head or stud, the stud or head engaging portion being surrounded by a flange which is closed in over a circular head on the pin, so that the pin may be used as a support for the socket and as a means for attaching the device to an upholstered body, as I will proceed now to explain and finally claim.

Obviously, the socket may be rigid or non-resilient to cooperate with a resilient stud or head, or, as herein shown, the socket may be resilient to cooperate with a non-resilient or rigid stud or head.

Figure 1:
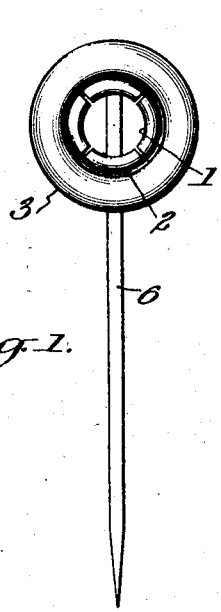
Figure 2:
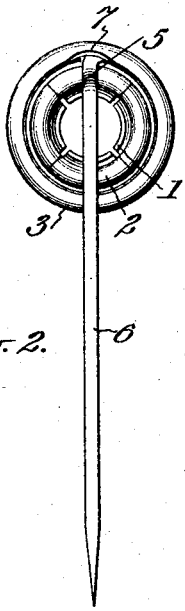
Figure 3:
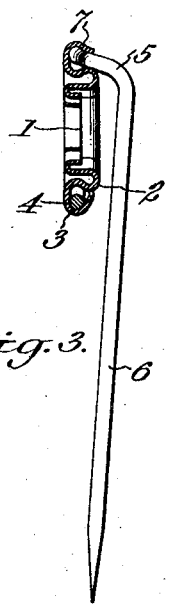
Figure 4:
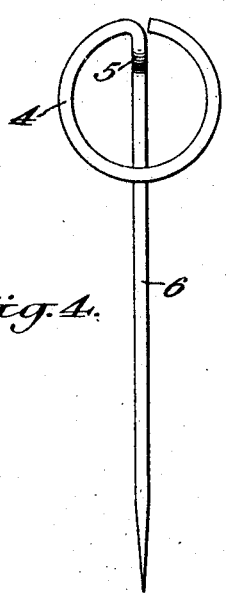
Figure 5:
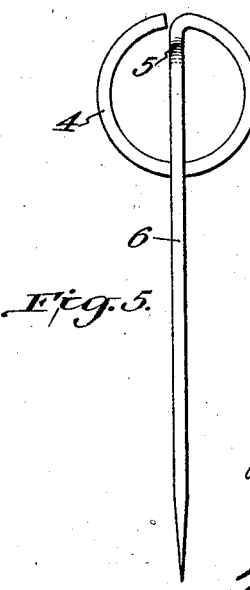

In the accompanying drawings illustrating the invention, in the several figures of which like parts are similarly designated, Figure 1 is a front elevation; Fig. 2 is a rear elevation, and Fig. 3 is a sectional elevation illustrating the invention in one form. Figs. 4 and 5 are respectively front and rear elevations of the pin detached.

The socket member when made in accordance with the Warner or the Hyde patents above mentioned, has the stud or head engaging resilient portion 1, which is carried outwardly in folds 2 into a surrounding flange 3.

The pin comprises the integral circular head 4, next to which is the hump 5, and beyond which last is the extended pointed limb 6. The hump 5 serves to throw the circular portion 4 in advance of the limb 6, so that the device may be inserted in the upholstered body up to the hump and between the back of the socket and the front of the pin.

The flange 3 of the socket, receives the circular portion 4 of the pin and is closed down over such portion, so as to make a firm union between the socket and the pin. It may be desirable to notch or crimp the flange about the pin, as shown at 7, Fig. 2, in order more securely to hold the socket from rotating on the pin.

By the construction described, the stud or head member of the fastener may be fixed to the cover, and the complemental socket member, mounted on the pin, as described, may be stuck in the upholstered body at a point to register accurately with the stud or head member. Any number of complemental stud or head members and socket members may be used to secure the cover in place and to attach the cover in a smooth, flat and symmetrical manner. Obviously the pin-mounted sockets may be adjusted accurately in order to ensure this smooth flat attachment and prevent puckering.

Obviously it is within my invention to mount the stud or head member on a pin and in that case, the complemental member will be fixed to the cover.

The pin is made of wire, and the circular head is in the form of an annulus whereby the socket member may be sunk more or less within the head in order to prevent undue projection and to permit a close fit of the attached cover.

Variations in details of construction are permissible within the principle of the invention and the scope of the claims following.

What I claim is:—

1. A snap fastener member, having a surrounding flange, and a single supporting pin provided with a circular head over which the flange is closed in order to unite the two and permit the pin to be stuck in a suitable body to mount its snap fastener member in position to be engaged by a complemental snap fastener member carried by a body to be attached.

2. A single pin socket, comprising a resilient socket member having a surrounding flange, and a supporting pin provided with a circular head over which the flange is closed so as to unite the socket member and pin.

3. A single pin socket, comprising a resilient socket member having a surrounding flange, and a supporting pin made of wire provided with an annular head over which the flange is closed so as to unite the socket member and pin and within which the socket member is sunk.

In testimony whereof I have hereunto set my hand this 18th day of February A. D. 1927.

PAUL E. FENTON.